United States Patent [19]

Faris et al.

[11] Patent Number: 5,245,686
[45] Date of Patent: Sep. 14, 1993

[54] METHOD OF FABRICATING AN IMAGE PLANE TRANSLATOR DEVICE AND APPARATUS INCORPORATING SUCH DEVICE

[76] Inventors: Sadeg M. Faris, 8 Skyline Dr., Hawthorne, N.Y. 10532; Kanti Jain, 18 Algonquian Trail, Briarcliff Manor, N.Y. 10510

[21] Appl. No.: 755,964

[22] Filed: Sep. 6, 1991

[51] Int. Cl.⁵ .................................................. G02B 6/08
[52] U.S. Cl. ...................................... 385/120; 385/116; 359/900
[58] Field of Search ...................... 385/115–120, 385/900; 340/705; 359/42, 900

[56] References Cited

U.S. PATENT DOCUMENTS

| | | | |
|---|---|---|---|
| 3,398,669 | 8/1968 | Hicks | 385/116 |
| 3,837,727 | 9/1974 | Norton | 385/120 |
| 3,907,403 | 9/1975 | Maeda | 385/120 |

*Primary Examiner*—John D. Lee
*Assistant Examiner*—John Ngo

[57] ABSTRACT

A revised image plane translator (RIPT) for a multi-pixel display is made by forming an array of subpixel position cells of refractive index $n_a$ glass frit in a binder, enclosing each cell in lower refractive index $n_b$ or $n_c$ glass frit, vitrifying the array by curing at vitrification temperature for a appropriate time, cutting the array into plates of appropriate thickness to serve as face plates, and then adding appropriate pixel controls and colorations. As a result, the face plate is inexpensive to make, robust, and of very high image quality since each pixel is a cell insulated from its neighboring cells by glass of lower refractive index $n_b$ or $n_c$; this traps light within the cell so that the cell can transmit the pixel without interference from its neighboring pixel position cells. There is no loss of resolution due to divergence through the thickness of the face plate. The RIPT serves as a substrate for a liquid crystal display or afield emission display, isolating high-temperature processes for semiconductor deposition and subsequent low-temperature processes for printing the pixel-defining color filters and background. This permits the use of heat-sensitive pixel defining color filters on the outer surface together with an unpatterned phosphor layer on the inner surface.

29 Claims, 2 Drawing Sheets

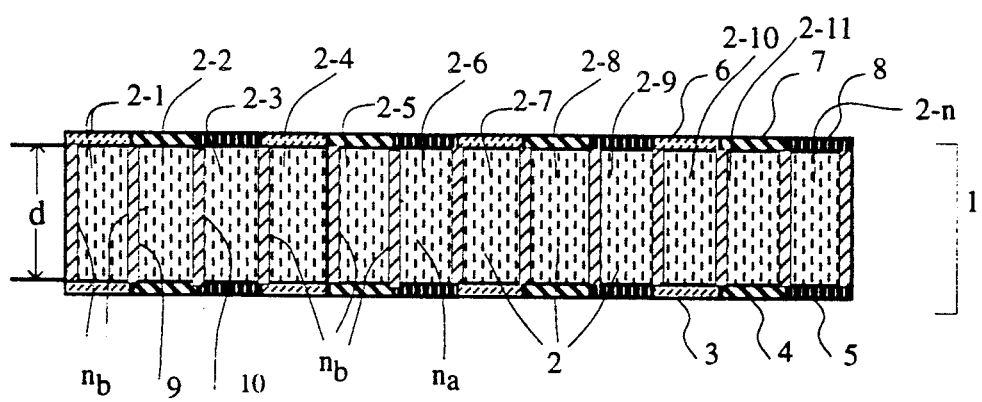
Fig. 1
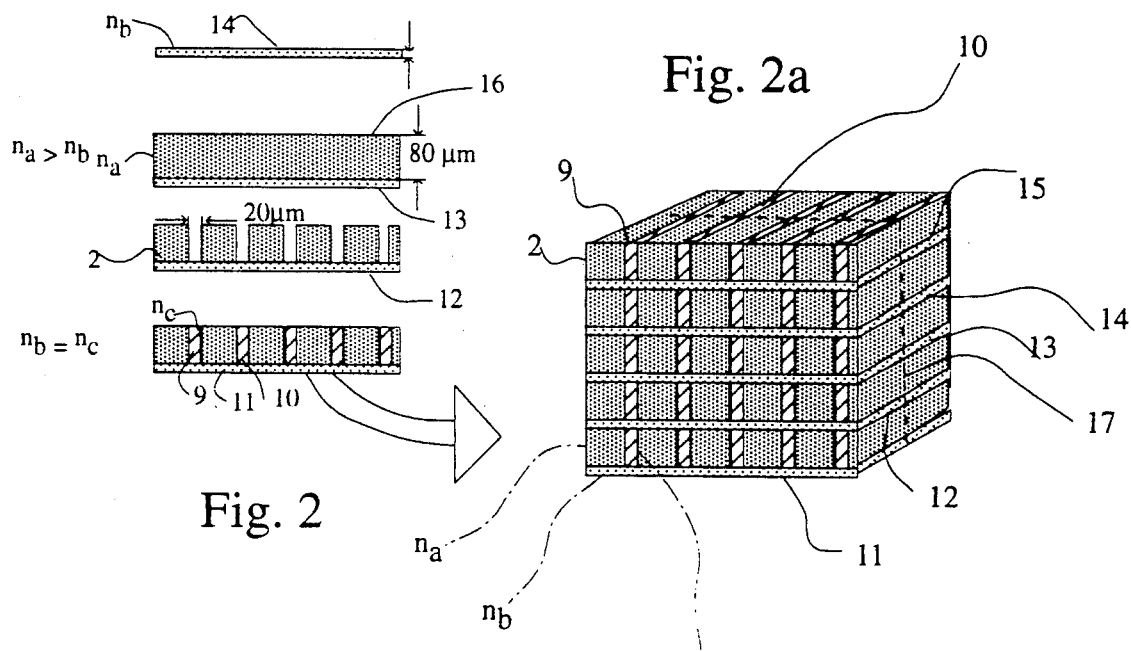
Fig. 2
Fig. 2a
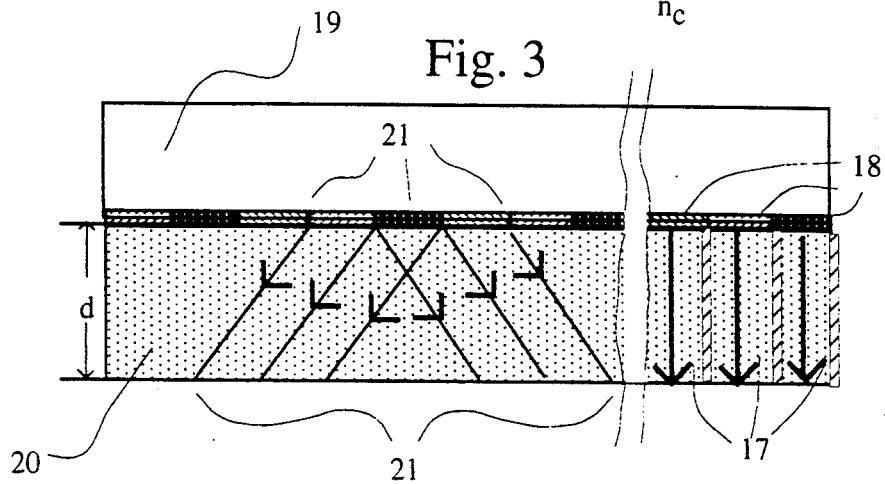
Fig. 3

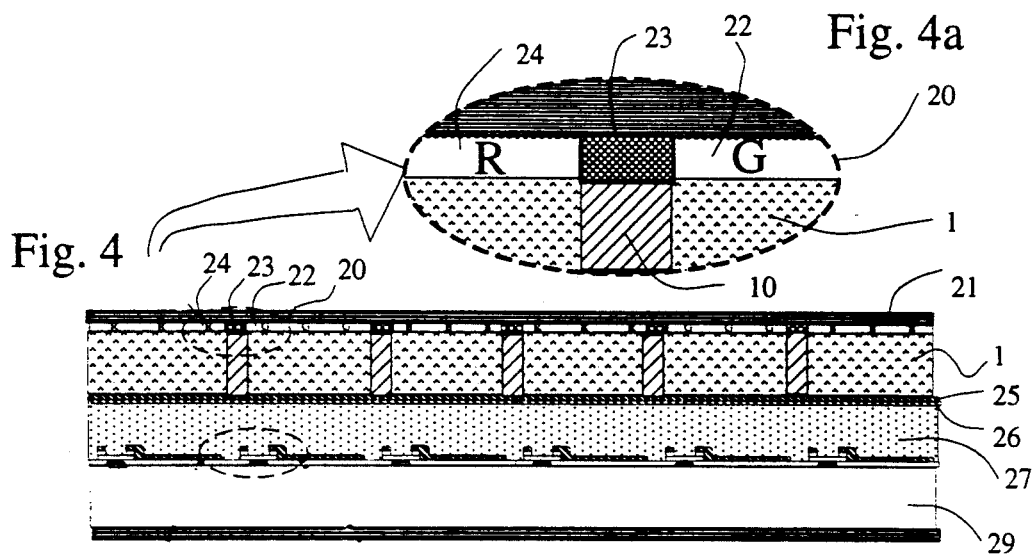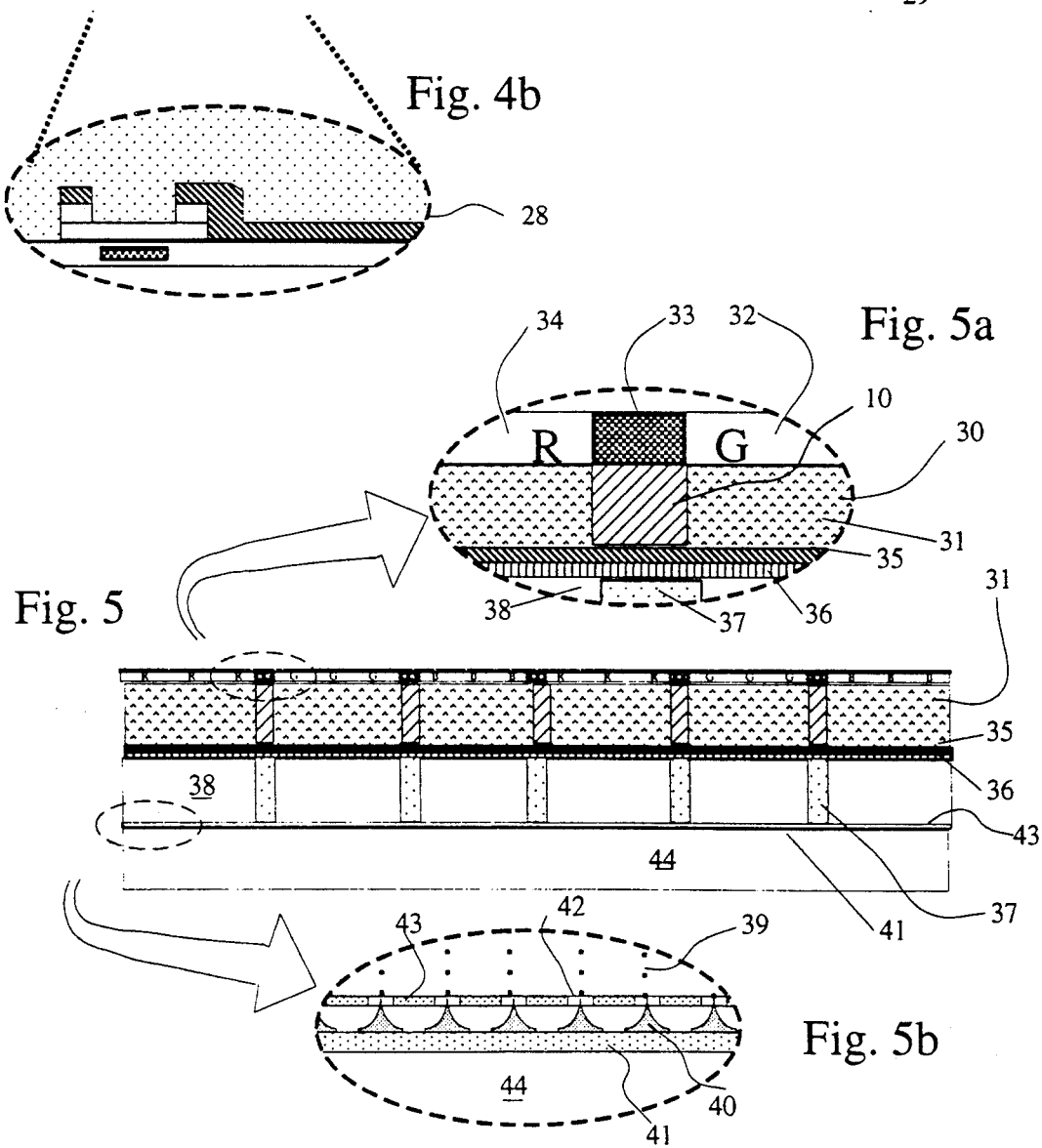

METHOD OF FABRICATING AN IMAGE PLANE TRANSLATOR DEVICE AND APPARATUS INCORPORATING SUCH DEVICE

BACKGROUND OF THE INVENTION

1. Field of the Invention

This invention relates to electronically variable large-information-content displays, and more particularly relates to displays featuring a novel image plane translator as a face plate or substrate which transfers subpixel beamlets from the translator's inner surface to its outer surface without divergence.

2. Summary of Prior Art

In the manufacturing of display devices based on cathode ray tube, liquid crystal display, field emission display, and thin film electroluminescence (CRT, LCD, FED and TFEL) technologies, the glass face plate plays a major role as a substrate. The light emitting pixels are on the inner surface of the face plate and the image is viewed by the observer on the other side. Each pixel (i.e., picture element) which may be thought of as a unitary dot of appropriate color combination, is made up of several subpixels which, when mixed by the human eye, provide the color to be sensed. Subpixels of red, green and blue in various combinations provide a full color capability to the pixel. The face plate must be thick enough to provide sufficient mechanical strength, and should have acceptable thermal, optical, vacuum-seal, and chemical properties in order to deliver good image quality with low manufacturing cost. For purposes of this discussion, the subpixel is an individual spot of light of a primary color. Normally, three subpixels (red, green and blue—R, G, B) are grouped as a three-subpixel basic pattern unit. In a display for human eyes, the pattern unit is integrated by the human eye and brain as one full-color pattern pixel.

In displays viewed directly by the human eye, the thickness of the display face plate does not cause image degradation because the eye images each pixel through the thickness of the face plate directly on the retina. There are, however, numerous situations in which the image as generated on the inner surface of the face plate is not viewed directly; instead, further processing of the image (such as translation or modulation) is required on a subpixel-by-subpixel basis. That is, the individual beamlets of light generated from all subpixels on the face-plate inner surface must be transmitted accurately to another image plane (in a receiving device) for further processing. Clearly, in a conventional display that uses a conventional face plate, the thickness of the face plate may make such further processing impossible, since radiation from the subpixels diverges within the face plate, prior to being supplied to the receiving device for further processing. Overlap between rays from adjacent pixels reaching the receiving surface may be so great that individual pixels can no longer be resolved.

The problem of pixel-wise transferring an image from one plane to another is solved by using an image plane translator (IPT) as a face plate. An IPT transfers the subpixel beamlets from its inner surface to its outer surface without expansion by divergence. This has the effect of making the face plate appear as through it has zero thickness. The conventional IPT, although expensive, has become a frequently-used solution for tandem light processing systems which require image transfer through glass without divergence of the subpixel beamlets.

The construction of prior-art IPTs is based on fiber-optic technology. A fiber-optic IPT is essentially a fused bundle of short optical fibers. Each optical fiber extends from the inner surface to the outer surface of the composite face plate, forming interference-free light pipes—one per pixel (or subpixel)—to carry each pixel through to the outer surface without spreading to adjacent pixels. Manufacturing processes for such IPT plates made of a large number of fused optical fibers are very complex, leading to very high-cost plates (nearly $10,000/plate for a 25 cm diagonal display). Consequently, the use of such IPT plates is limited to only a few display applications, generally quite small in area, where the overall system cost is high (so that the IPT cost is only a small fraction of the total system cost).

There is, therefore, a great need for an inexpensive high-quality IPT which can be used as a substrate for high-quality large displays. That is, there is a need for an IPT that is big enough, strong enough and inexpensive enough to be used as the face plate in a wide variety of displays and other applications where pixel-wise transposition of the image from an inner surface to an outer surface is required or desirable.

SUMMARY OF THE INVENTION

The object of the invention is to fabricate a novel image plane translator (henceforth called a "Reveo Image Plane Translator", or "RIPT") using a radically new technology by which the RIPT can replace a conventional high-cost fiber-optic image plane translator, allowing a greatly expanded image area and a low cost, making the RIPT an ideal translator for displays and other devices in which subpixel processing takes place between tandem image planes.

Another object of the invention is to provide a variety of displays in which the RIPT is configured as a substrate and face plate in such a way that its three-dimensional array of optical light pipes serve to transfer individual subpixels from the RIPT's inner surface to its outer surface, thereby enabling significant simplification in the display manufacturing processes and thus substantially lowering display costs.

A feature of the invention is its radically new and innovative manufacturing process that uses green sheets of glass frit in a binder for producing the RIPTs in blocks, which are then cut into individual slices. Such a manufacturing technology, contrasted with the prior-art fiber-optic technology, no only has the potential for reducing the IPT cost by at least an order of magnitude, but also lends itself to low-cost production of IPT plates in large areas.

Another feature of the invention is its ability to accept and/or deliver subpixels of rectangular or other polygonal shapes as well as circular, to achieve higher pixel densities or other desired effects.

An advantage of the invention is that by using the low-cost RIPT plates as temperature-dividing substrates in large-area high-resolution displays, numerous process steps in the fabrication of the displays can be transferred to the outer surface of the RIPTs, thereby significantly simplifying the overall display manufacturing processes, and therefore their cost.

Other objects, features and advantages of the invention will be obvious from the following drawings and the related description.

FIGURES

FIG. 1 is a schematic drawing of a Reveo image plane translator (RIPT) shown in crosssectional, illustrating individual pixel-guiding light pipes and walls separating them.

FIGS. 2 and 2a is a schematic composite drawing showing two- and three-dimensional views of how the RIPT is produced by laminating cut-and-filled green glass sheets in a block.

FIG. 3 is a composite diagram showing a prior-art display face plate with the divergence problem, and a prior-art image plane translator (IPT) illustrating its pixel-guiding channels.

FIGS. 4, 4a and 4b is a semi-schematic cross-section drawing of a liquid crystal display (LCD) based upon the RIPT as a substrate;

FIGS. 5, 5a and 5b is a semi-schematic cross-section drawing of a field emission display (FED) based upon the RIPT as a substrate.

DESCRIPTION OF A PREFERRED EMBODIMENT

FIG. 1 illustrates a partial cross section of a REVEO Image Plane Translator (RIPT) plate. The fundamental concept consists in producing an array 1 of "subpixel-guiding" cells 2 in the form of optical channel waveguides in a thin glass sheet. The material within each cell 2 is of refractive index $n_a$. Each cell 2 is surrounded by a thin layer of glass of a lower index of refraction $n_b$ ($n_a > n_b$). The two-dimensional array of polygonal waveguides thus created transfers the subpixel information from the inner surface to the outer surface, without the image degradation that would result due to divergence in passing pixel information through the thickness of a glass substrate not equipped with the pixel-guides. The outer pixel-emission surface thus has exactly the subpixel information as the inner pixel-origination surface of the RIPT. The result is a divergence-free subpixel information transfer from the effective pixel origination plane (inner surface) of the face plate to the outer surface.

The RIPT plate 1 has a multiplicity of subpixel guide cells (2-1, 2-2, 2-3, ... 2n in FIG. 1) of a material of a higher refractive index $n_a$ surrounded by a material of a lower refractive index $n_b$. Note that each pixel guide cell 2 is a loss-free light pipe. The interface between a light-transmissive material of refractive index $n_a$ and another material of refractive index $n_b$ ($n_a > n_b$) keeps all the light within subpixel guide 2 which, because of total internal reflection of the light rays within it, functions as a lossless light pipe.

The RIPT may serve to replace the conventional fiber-optic IPT as an image plane translator. It may also serve as a substrate for deposition and processing of additional materials (3-8 shown). The transition between light-guiding cells is by a relatively thin layer (9 and 10 shown) of a material of lesser refractive index ($n_b$ or $n_c$) than the refractive index $n_a$ of the cell material. This transition from a higher to a lower index of refraction makes the each cell a lossless light pipe for the subpixel beamlet assigned to the cell.

The RIPT may have all its cells identical to each other, or some of the cells may be of different sizes from others. Preferably, RIPT cells are fabricated in the shape of parallelograms, usually square or rectangular. With appropriate modifications, trapezoidal, variegated and oval cells, and even cells of random shapes, may be included in the RIPT.

DESCRIPTION OF A PREFERRED EMBODIMENT—PROCESS

FIG. 2 shows the process for making the Reveo Image Plane Translator (RIPT). The key steps in the new process are as follows:

1. Make a laminate of a 80 micron thick green glass sheet of index $n_a$ and a 20 micron thick green glass sheet of index $n_b$ ($n_a > n_b$), each green glass sheet being made of a suitable glass frit and a binding material such as polyvinyl alcohol (PVA). The technology for forming green glass sheets from glass frits and PVA is well known. The glass frits can be ordered in a variety of frit grain sizes and fusing temperatures; suppliers include the Corning Glass Company. The melting temperature for all green glass frits in the preferred embodiment is in the vicinity of 600° C. Note that the melting temperatures are not critical as long as the fusing temperatures of all frits are matched for simultaneous fusing in the same heating step. The frits should have overlapping ranges of fusing temperatures, commonly called "vitrification" temperatures, at which the green glass fuses without significant deformation.

2. Feed the above two-sheet laminate into a rolling device consisting of two counter-rotating cylinders, one of which is designed to cut or press full-depth grooves into the $n_a$ material, the grooves being ~20 μm wide and spaced with a patch of ~100 μm.

3. Fill the grooves with a green glass slurry of index $n_c$ ($n_c < n_a$). The slurry material, in principle, could be the same as the $n_b$ material; however, manufacturing process details may dictate use of different compositions for $n_b$ and $n_c$. Clean off, e.g. by scraping, excess $n_c$ material after filling the grooves. Then $n_a$ regions now act as multimode channel waveguides of a square cross section.

4. Laminate several (~$10^3$-$10^4$) such $n_a/n_b/n_c$ sheet-pairs together.

5. Slice off face plates from the above stack, cutting in planes perpendicular to the axes of the light-guiding channels.

6. Cure the still green face plates by firing them at an appropriate temperature and for a suitable duration. This step breaks the PVA into water vapor and carbon dioxide gas which are driven off. The resulting product is hardened RIPT face plates, each with $10^6$-$10^8$ subpixel guiding cells. It is important that the heating during the final curing step by carried out slowly at the vitrification temperature of the frits, so that the cure duration is long enough to vitrify the glass, but at the same time, the cure temperature is not high enough to cause the glass to deform significantly. Finally, polish the surfaces of the face plates.

While it is preferred that the face plates be sliced first and then cured and polished, variations of steps 5 and 6 are possible. From example, the entire laminated block may be cured first and individual face plates may be sliced and polished afterwards. In addition, a grinding operation may be inserted for dimensions control and to facilitate the polishing process.

The subpixel guiding cells 2 serve as optical waveguides that transfer subpixel beamlets from one side (inner surface) of the face plate to the other side (outer surface). The composite vitrified sheet is also capable of serving as a substrate on which further depositions of suitable materials or other processes can be carried out for various applications, e.g., for display manufacturing. Although it is preferred that such additional processes be carried out at temperatures lower than the vitrification temperature, in which case they can be of long durations, the face plate will also withstand processes that require temperatures high than the vitrification temperature provided they are for short durations.

With the simplicity of the new process, its extremely high throughput, and therefore its suitability for volume manufacturing, RIPT costs as low as ~$2.00-$4.00/ square centimeter can be realized. This is to be compared with the current fiber-optic IPTs which cost in the vicinity of $35.00 / square centimeter! Such a low-cost RIPT technology makes it possible to contemplate using radically new, simple and lower-cost methods for manufacturing LCD, FED and other displays.

COLOR DISPLAYS USING RIPT AS A SUBSTRATE

The operation of many prior art color displays including those based on LCD, FED, CRT, TFEL and plasma technologies depends on defining and locating the color pixel (the light emitting element) on the inner surface of a glass face-plate or a glass substrate. For instance, the filters in an LCD or the phosphors in CRT, FED, and plasma displays are responsible for generating color. These elements are placed on the inner surface of the face plate by means of unique manufacturing processes which have unique constraints and problems which affect the yield and contribute significantly to the cost of the displays. One of the major constraints is the sequential deposition of color filter or phosphor materials which have to withstand high processing temperatures and have to be patterned by complex steps to define the color pixels. In all of these display technologies, many of the complex steps and temperature constraints can be eliminated or minimized if the conventional glass face plate is replaced by the RIPT element made according to this invention. The RIPT as a face late makes it possible to transfer the pixels from the inner surface to the outer surface of the face plate and therefore, patterned color filter sheets can be simply laminated on the outer surface of the RIPT face plate to produce color. Said patterned filter sheets, which are laminated after the display fabrication is complete, are no longer subjected to thermal, vacuum, mechanical, electrical, and chemical patterning constraints, as is the case in prior art processes. Instead, said filter sheets are made by very inexpensive mean such as high throughput printing of clear plastics. Therefore, the results of using a RIPT element as a face plate are the significant simplification of the manufacturing processes of displays, increasing the yield and lowering the cost.

COLOR LIQUID CRYSTAL DISPLAY ON RIPT

Prior art color active matrix liquid crystal displays comprise the liquid crystal material that is interposed between first and second glass substrates. Thin film transistors, patterned transparent electrodes made of indium-tin-oxide, and an aligning layer of polyimide are fabricated on the inner surface of said first glass substrate. The filters, a second transparent electrode made of indium-tin-oxide, and a second aligning layer of polyimide are fabricated on the inner surface of said second glass substrate. The red, green, and blue filters are deposited sequentially by means of complex process steps. The filter materials are designed to give good color saturation, minimize interface reflection, maximize filter transmission, should be electrical insulators, and should withstand high temperatures which result from the deposition of the indium-tin-oxide and the polyimide. Such complex filter design and manufacturing affect the yield and the cost of the displays. These problems are solved by using color LCD displays by replacing the second glass substrate of prior art with a RIPT element.

FIG. 4 shows a Color Liquid Crystal Display based upon the RIPT as a substrate. RIPT 1 has deposited upon its outer surface the filter elements 22, 23, separated by a black strip 23 (for contrast enhancement), and on its inner surface an unpatterned indium-tin-oxide layer 25, and a polyimide layer 26 to align the liquid crystal 27. The thin film transistors 28 fabricated on the inner surface of the substrate 29 to control or modulate, independently, the light intensity of each pixel of the display. The display comprising elements 25-28 interposed between substrates 1 and 29 fabricated by conventional means creates monochrome images. It is converted easily to a color display by placing the elements filter elements 20-24 on the outer surface of RIPT substrate 1. This eliminates the problem of placement of color filters in hostile environment, and greatly enhances the yield by permitting the RIPT and color filters to be made and tested separately from the remainder of the components 25-30 which also can be made and tested separately.

COLOR FIELD EMISSION DISPLAY ON RIPT

Field Emission Display (FED) is a new and very promising technology for high-definition systems. Prior art color FEDs are made of microscopic-electron emitters (electron beamlets) fabricated on a first glass substrate and patterned color phosphor dots fabricated on the inner surface of a second glass substrate. Said first and second substrates are separated by a vacuum space by means of spacers and form a sealed vacuum chamber. One of the significant contributors to the cost of FEDs is the complex fabrication and patterning steps of the color phosphors. The unique problems and complexities associated with fabricating patterned color phosphors are eliminated by using a RIPT element to replace said second substrate of prior art FED. FIG. 5 illustrates a cross-sectional view of how an FED is constructed using a RIPT element 31, taken with the insets as the bottom and the top, shows the detail of a representative field emitter display. Micro-emitters 40, forming tiny peaks on emitter voltage layer 41 to the emitter grid hole 42 respectively positioned near its peak within emitter grid 43. Elements 40-43 are fabricated by known means on a glass substrate 44. Each selected-emitter peak 40 emits a stream of electrons 39 when activated by a high voltage potential across emitter voltage layer 41. Several of these tiny peaks 40 are selected for each subpixel to produce the subpixel beamlet. The emitters are separated from their related unpatterned white phosphor (similar to that used in black and white TV) layer 36 and indium tin oxide (ITO) layer 35 by a related vacuum chamber 38 which is supported by spacers 37. Layers 35, 36 are deposited by well known means on the inner surface of the RIPT substrate 31. A complete monochrome display panel can be made from elements 35-44. By laminating inexpensive color filters 32-34, the display becomes capable of full color without the need for the complexity of patterned color phosphor dots of prior art, thereby reducing the manufacturing cost significantly.

The key steps in the new process are as follows:
1. Make a laminate of a 80 micron thick green glass sheet of index $n_a$ and a 20 micron thick green glass sheet of index $n_b$ ($n_a > n_b$) each green glass sheet being made of a glass frit and a binding material such as polyvinyl alcohol (PVA). Technology for forming green glass sheets from green glass frit and PVA are well known and can be ordered in a variety of frit grain sizes and fusing temperatures. Suppliers include the Corning Glass Company. Preferred melting temperature is 600° C. for all green glass frits in the preferred embodiment. Note that melting temperatures are not critical so long as all frits have fusing temperatures matched for common fusing at the same heating step. All frits should have overlapping ranges of fusing temperatures commonly called "vitrifcation" temperatures, at which the glass fuses without melting to deformation.
2. Feed the above laminated double sheet into a rolling device consisting of two counterrotating cylinders one of which is deigned to cut/press full-depth grooves into the na material, the grooves being ~20 μm wide and spaced with a pitch of ~100 μm.
3. Fill the groove with a green glass slurry of index $n_c$ ($n_c < n_a$). The slurry material, in principle, could the same as the $n_b$ material; however manufacturing process details may dictate use of different compositions for and $n_c$. Scrape/clean off excess $n_c$ material after groove filling. The na regions now act as multimode channel waveguides of a square cross section.
4. Laminate several (~$10^3$-$10^4$) such $n_a/n_b/n_c$ sheets together.
5. Slice off face plates from the above stack, cutting perpendicularly to the axes of the lightguiding channels.
6. Finally, fire/cure the still green face plates at an appropriate temperature, breaking the PVA into $H_2O$ and $CO_2$ which are driven off and leaving the hardened and finished IPT face plates, each with $10^6$-$10^8$ pixel guide cells. It is preferred to heat slowly at the vitrification temperature of the frits present just long enough to vitrify the glass but not at such an elevated temperature as to cause the glass to deform significantly.
7. Deposit an indium tin oxide layer (ITO);
8. Deposit a simple blanket (unpatterned) layer of white phosphor on the inner surface of the RIPT (over the ITO layer).
9. Laminate the color filter composite, manufactured in wide rolls using well established, very low cost, high-throughput and high-yield printing techniques, to the outer surface of the RIPT.

The inset at the top of FIG. 5 shows elements 30-38 enlarged for clarity as pixel filter assembly 30. Pixel filter assembly 30 uses RIPT plate 31 as a substrate to carry R (red) 34 and G (green) 32 and B (blue) filters and black absorbers 33. The three complementary color filters, together with the black absorber, serve to define the subpixels and the border of a pixel, the basic color picture element. The pixel is made up of individual subpixels for each color. The subpixels are isolated from each other by the walls of the pixel guiding cells. For example, the red subpixel filter shown in the inset as 34 is aligned with the field emitter 38 in the related position to provide the red subpixel. The red subpixel is isolated from the adjacent green subpixel by cell wall 10. Field emitter 38 is defined by cell wall 37 which completes the seal to provide the necessary vacuum for electron emission.

In photographic and printing technologies, pixel definition is carried out with great precision and with very little concern for yield or even concern for cost. In electronic displays, however, pixel definition has been a problem both of cost ad yield, and usually requires a black contrast enhancement absorber between subpixels. The black absorber may be provided by overprinting the three complementary colors red, blue and green for example, or by printing black. Using the RIPT as a substrate, this invention allows simple printing techniques to be used for the ambient temperature pixel definition means, which can be separate parallel strips without intervening absorber, can be spot patterns without absorber, or can be strips or spot patterns, or other patterns, with absorber. The subpixel definition brought about by the use of the RIPT as substrate is sufficient in many cases to allow closely spaced filters of the complementary colors to serve without the absorber.

In operation, a matrix of connector electrodes and a selection array of transistors selects a particular subpixel (for example 38 in FIG. 5) and fires a stream of electrons through its vacuum. The electron beam hits a phosphor layer and causes a spot of monochromatic light to appear on phosphor 36 at the location of subpixel 38. Cell wall 10 and absorber element 33 keep the spot of light in place, directing it to red filter 34 without affecting subpixel 32.

NOTE: The same manufacturing line used for making monochrome FED's can also be used to produce color FED's. Photolithographic or other techniques for patterning the RGD phosphors and the black matrix on the substrate are made unnecessary, eliminating the plate size constraint imposed previously by the patterning equipment. Now, the white phosphor and ITO layers can be blanket-deposited on a very large-size substrate (IPT) in high-throughput, high-yield and low-cost steps. This replaces the patterned RGD phosphor dots by a simple blanket (unpatterned) deposition of white phosphor at the inner surface of the IPT (over an ITO layer).

While the invention has been shown and described as a RIPT plate, a method for making the RIPT plate, and displays using the RIPT as a substrate, it will be apparent to those skilled in the art to make the foregoing and other changes in form and detail without departing from the spirit and scope of the invention as defied in the following claims.

We claim:
1. An image plane translator made by the following process steps:
   step 1: making a laminated double sheet of thick green glass sheet of refractive index $n_a$ and a thin green glass sheet of refractive index $n_b$, $n_a > n_b$, each green sheet being made of a glass frit and a binding material which breaks down into volatile components upon heating;
   step 2: feeding said laminated double sheet into a rolling device to form full-depth grooves into the material having refractive index na said grooves having a predetermined depth and pitch;
   step 3: filling the grooves with a green glass slurry of refractive index $n_c$, $n_c < n_a$, and remove excess material having refractive index $n_c$ after groove filling the regions having refractive index $n_a$ now acting as multimode channel waveguides of a rectangular cross section;

step 4: laminating a plurality of said sheets together;

step 5: slicing off face plate from the above stack, cutting perpendicularly to the axes of the light-guiding channels; and step 6: curing the still green face plates by firing at appropriate temperatures, breaking the binder into volatile components which are driven off, and the hardened and finished image plane translator face plates, each with a multiplicity of subpixel guide cells which act as optical waveguides that transfer subpixels from the pixel generation surface to the pixel exit surface.

2. The process for making an image plane translator, comprising the following process steps;

step 1: making a laminated double sheet of a thick green glass sheet of refractive index $n_a$ and a thin green glass sheet of refractive index $n_b$, $n_a > n_b$, each green sheet being made of a glass frit and a binding material which breaks down into volatile components upon heating;

step 2: feeding said laminated double sheet into a rolling device to form full-depth grooves into the material having refractive index $n_a$, said grooves having a predetermined depth and pitch;

step 3: filling the grooves with a green glass slurry of refractive index $n_c$, $n_c < n_a$, and remove excess material having refractive index $n_c$ after groove filling, the na regions now acting as multimode channel waveguides of a polygonal cross section;

step 4: laminating a plurality of said sheets together;

step 5: slicing off face plates from the above stack, cutting perpendicularly to the axes of the light-guiding channels; and step 6: curing the still green face plates by firing at appropriate temperatures, breaking the binder into volatile components which are driven off, and leaving the hardened and finished image plane translator face plate, each with a multiplicity of subpixel guide cells which act as optical waveguides that transfer subpixels from the pixel generation surface to the pixel exit surface.

3. The process according to claim 2, wherein said binding material is polyvinyl alcohol (PVA).

4. The process according to claim 2, further characterized by the following addition to step 6: Polish at least one surface.

5. A product comprising a substrate image plane translator made by the following process:

step 1: making a laminated double sheet of a thick green glass sheet of refractive index $n_a$ and a thin green lass sheet of refractive index $n_b$, $n_a > n_b$, each green sheet being made of a glass frit and a binding material which breaks down into volatile components upon heating;

step 2: feeding said laminated double sheet into a rolling device to form full-depth grooves into the material having refractive index $n_a$, said grooves having predetermined depth and pitch;

step 3: filling the grooves with a green glass slurry of refractive index $n_c$, $n_c < n_a$, and remove excess material having refractive index $n_c$ after groove filling, the regions having refractive $n_a$ now acting as multimode channel waveguides of a (polygonal) geometrical cross section;

step 4: laminating a plurality of said sheets together;

step 5: slicing off face plates from the above stack, cutting perpendicular to the axes of the light-guiding channels; and step 6: curing the still green face plates by firing at appropriate temperatures, breaking the binder into volatile components which are driven off, and leaving the hardened and finished image plane translator face plates, each with a multiplicity of subpixel guide cells which act as optical waveguides that transfer subpixels from the pixel generation surface to the pixel exit surface.

6. The image plane translator according to claim 5, in which a substantial number of said waveguides are polygonal in shape.

7. The image plane translator according to claim 6, in which a substantial number of said waveguides are rectangular in shape.

8. The image plane translator according to claim 7, in which a substantial number of said waveguides are square in shape.

9. The image plane translator according to claim 6, in which a substantial number of said waveguides are trapezoidal in shape.

10. The image plane translator according to claim 6, in which a substantial number of said waveguides are parallelograms in shape.

11. The image plane translator according to claim 6, in which a substantial number of said waveguides are ovoid in shape.

12. The image plane translator according to claim 5, in which a substantial number of said waveguides are different in shape from other cells.

13. A high definition microchannel plate prepared in accordance with the process of claim 5, comprising the following additional steps:

step 1: making a laminated double sheet of a thick green glass sheet of refractive index $n_a$ and a thin green glass sheet of refractive index $n_a$, $n_a > n_b$, each green sheet being made of a glass frit and a binding material such as polyvinyl alcohol (PVA);

step 2: feeding the above laminated double sheet into a rolling device consisting of two counter-rotating cylinders one of which is designed to cut/press full-depth grooves into the material having refractive index $n_a$ the grooves being about 20 μm wide and spaced with a pitch of about 100 μm;

step 3: filling the grooves with a green glass slurry of refractive index $n_c$, $n_a > n_c$, and scrape/clean off excess material having refractive index $n_c$ after groove filling, the regions have refractive index $n_a$ now acting as multimode channel waveguides of a polygonal cross section;

step 4: laminating a plurality of said sheets together;

step 5: slicing off face plates from said stack, cutting substantially perpendicularly to the axes of the light-guiding channels; and step 6: finally, firing/curing the still green face plates at an appropriate temperature, slightly above verification temperatures for the green glass frits involved, breaking the PVA into $H_2O$ and $CO_2$ which are driven off, and leaving the hardened and finished image plane translator face plates, each with a multiplicity of subpixel guide cells to serve as optical waveguides that transfer pixels from the inner surface to the outer surface.

14. A color display device in liquid crystal display (LCD) technology, having a glass first substrate with a transistor array, prepared by a hot process, as a first subassembly to provide the subpixel definition; and
an ambient temperature process subassembly comprising:
a image plane translator having first and second surfaces; conductive transparent means and liquid crystal means arrayed upon said first surface, said image plane translator being mounted juxtaposed to said first subassembly in a fashion to provide noncolorized subpixels at said first surface of said image plane translators, said image plane translator acting as a divergence minimizing image transfer means and as isolation means; and
a set of ambient temperature pixel characterization means arrayed upon the surface of said RIPT opposite said first assembly.

15. A color display according to claim 14, further characterized in that said phosphor means is an unpatterned complete layer.

16. A color display according to claim 14, further characterized in that said set of ambient temperature pixel characterization means comprises complementary color filters.

17. A color display according to claim 16, further characterized in that said set of ambient temperature pixel characterization means comprises a contrast enhancement absorber separating said color filters.

18. A color display according to claim 17, further characterized in that said set of ambient temperature pixel characterization means includes at least one element which is incompatible with a high temperature process.

19. A color display according to claim 16, further characterized in that said set of ambient temperature pixel characterization means includes elements which are incompatible with a high temperature process.

20. A color display device in field emission display (FED) technology, which can provide selective subpixel beamlets in response to information inputs from a source characterized by
a first subassembly which is made of field emission display emitters arrayed to provide electron beamlets; and
a second subassembly mounted adjacent said first subassembly to provide completion of the field emission display and to provide isolation from ambient environment components, including image plane translator means having a first surface and a second surface, a noncolorized phosphor arrayed on said first surface, in juxtaposition with said first subassembly, to provide vacuum chamber means making field emission operative to activate said phosphor for production of subpixel beamlets of noncolorized light at said first surface and to transfer said subpixel beamlets as divergence-free subpixel beamlets to its second surface; and ambient temperature pixel characterization means arrayed upon said second surface.

21. A color display according to claim 20, further characterized in that said phosphor means is an unpatterned complete layer.

22. A color display according to claim 21, further characterized in that said ambient temperature pixel characterization means comprises a contrast enhancement absorber separating said color filters.

23. A color display according to claim 22, further characterized in that said set of ambient temperature pixel characterization means include at least one element which is incompatible with a high temperature process.

24. A color display according to claim 22, further characterized in that said set of ambient temperature pixel characterization means includes elements which are incompatible with a high temperature process.

25. A color display according to claim 20, further characterized in that said set of ambient temperature pixel characterization means comprises a set of complementary color filters.

26. A color display comprising:
(a) an image plane translator, having first and second surfaces;
(b) noncolorized subpixel production means coupled to said image plane translator at said first surface in such fashion that noncolorized subpixels of light applied to said first surface are transferred without diffraction divergence to said second surface; and
(c) subpixel colorization means applied to said second surface of said image plane translator to form color pixels.

27. A color display according to claim 26, wherein said noncolorized subpixel production means is of materials which can withstand elevated temperature processes and wherein said subpixel colorization means is of materials which are not subject to damage by elevated temperature processes.

28. A color display according to claim 26, wherein said noncolorized subpixel production means is of materials which can withstand high vacuum processes and wherein said subpixel colorization means is of materials which are not subject to damage by high vacuum processes.

29. A color display according to claim 26, wherein said image plane translator is made up of fused green glass frit in cells of diffraction coefficient $n_a$ surrounded by fused green glass frits of diffraction coefficient less than $n_a$.

* * * * *